US008611886B2

(12) United States Patent
Ho et al.

(10) Patent No.: US 8,611,886 B2
(45) Date of Patent: Dec. 17, 2013

(54) REMOTE ELECTRICAL TILTING ANTENNA SYSTEM MEASUREMENT VIA DOWNLINK ANTENNA

(75) Inventors: Ming-Ju Ho, Alpharetta, GA (US); Stalin Fernando Albanes, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 786 days.

(21) Appl. No.: 12/262,780

(22) Filed: Oct. 31, 2008

(65) Prior Publication Data

US 2010/0112996 A1  May 6, 2010

(51) Int. Cl.
*H04W 4/00* (2009.01)

(52) U.S. Cl.
USPC .... 455/422.1; 370/334; 455/63.4; 455/67.11; 455/419; 455/562.1

(58) Field of Classification Search
USPC ........ 343/751, 777, 782, 865; 455/63.1, 63.4, 455/65, 67.11, 67.13, 101, 277.1, 277.2, 455/403, 418, 446, 447, 448, 453, 500, 560, 455/561, 562.1; 370/332–334
See application file for complete search history.

(56) References Cited

U.S. PATENT DOCUMENTS

| | | | | |
|---|---|---|---|---|
| 4,249,181 A | * | 2/1981 | Lee | 342/367 |
| 6,282,434 B1 | * | 8/2001 | Johannisson et al. | 455/562.1 |
| 6,745,003 B1 | * | 6/2004 | Maca et al. | 455/11.1 |
| 6,810,088 B1 | * | 10/2004 | Griepentrog et al. | 375/259 |
| 7,120,431 B1 | * | 10/2006 | Huo et al. | 455/423 |
| 2005/0250457 A1 | * | 11/2005 | Mester et al. | 455/101 |
| 2007/0161348 A1 | * | 7/2007 | Gribben et al. | 455/13.3 |
| 2009/0143018 A1 | * | 6/2009 | Anderson et al. | 455/67.11 |
| 2009/0264119 A1 | * | 10/2009 | De Pomian | 455/424 |

OTHER PUBLICATIONS

"Enhanced 911" from Wikipedia, 7 pages, downloaded Sep. 9, 2008, URL: http://en.wikipedia.org/wiki/E-911.
"TruePosition® Location Measuring Unit™ (LMU)," True Position Global Wireless Location Solutions, 2 pages, downloaded Sep. 4, 2008, URL: http://www.trueposition.com/location-measurement-unit.php.

* cited by examiner

*Primary Examiner* — Wesley Kim
*Assistant Examiner* — Dinh P Nguyen
(74) *Attorney, Agent, or Firm* — Abel Law Group, LLP

(57) ABSTRACT

A technique for operating an antenna system includes using a downlink antenna to provide radio frequency information to a central antenna controller and adjusting operating parameters of the antenna system based thereon. In at least one embodiment of the invention, an apparatus includes a central antenna control facility configured to communicate at least one operation parameter to a first antenna facility associated with a first antenna in a first cell coverage area. The at least one operation parameter is determined at least partially based on information associated with a signal received from the first antenna by a downlink antenna in a second cell coverage area.

22 Claims, 3 Drawing Sheets

REMOTE ELECTRICAL TILTING ANTENNA SYSTEM MEASUREMENT VIA DOWNLINK ANTENNA

BACKGROUND

1. Field of the Invention

This invention relates to radio frequency communications systems and more particularly to mobile communications systems including remotely accessible antenna systems.

2. Description of the Related Art

Performance of mobile communications systems including remotely accessible antenna systems may vary substantially by adjusting operating parameters of the antenna system. Typically, operating parameters of an antenna system are set during initial system deployment and may be adjusted after deployment in response to traffic distribution changes, to reduce interference, or other factors. In general, after adjusting an operating parameter of an antenna system, one or more calibration or performance verification techniques are performed.

SUMMARY

A technique for operating an antenna system includes using a downlink antenna to provide radio frequency information to a central antenna controller and adjusting operating parameters of the antenna system based thereon. In at least one embodiment of the invention, an apparatus includes a central antenna control facility configured to communicate at least one operation parameter to a first antenna facility associated with a first antenna in a first cell coverage area. The at least one operation parameter is determined at least partially based on information associated with a signal received from the first antenna by a downlink antenna in a second cell coverage area.

In at least one embodiment of the invention, an apparatus includes a control facility in a first cell coverage area configured to communicate to a central antenna control facility information at least partially based on a signal received from an antenna in a neighboring cell site in a second cell coverage area by a downlink antenna in the first cell coverage area. The apparatus may include the central antenna control facility. The central antenna control facility is configured to communicate at least one operation parameter to a first antenna facility associated with the neighboring cell site in the second cell coverage area. The at least one operation parameter may be determined at least partially based on information received from the control facility.

In at least one embodiment of the invention, a method includes updating at least one operation parameter of an antenna associated with a first cell site in a first coverage area at least partially based on information at least partially based on a signal received from the first cell site by a downlink antenna of a second cell site in a second coverage area. The method may include comparing a measurement based on the information to a predetermined value and determining the at least one operation parameter at least partially based thereon.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
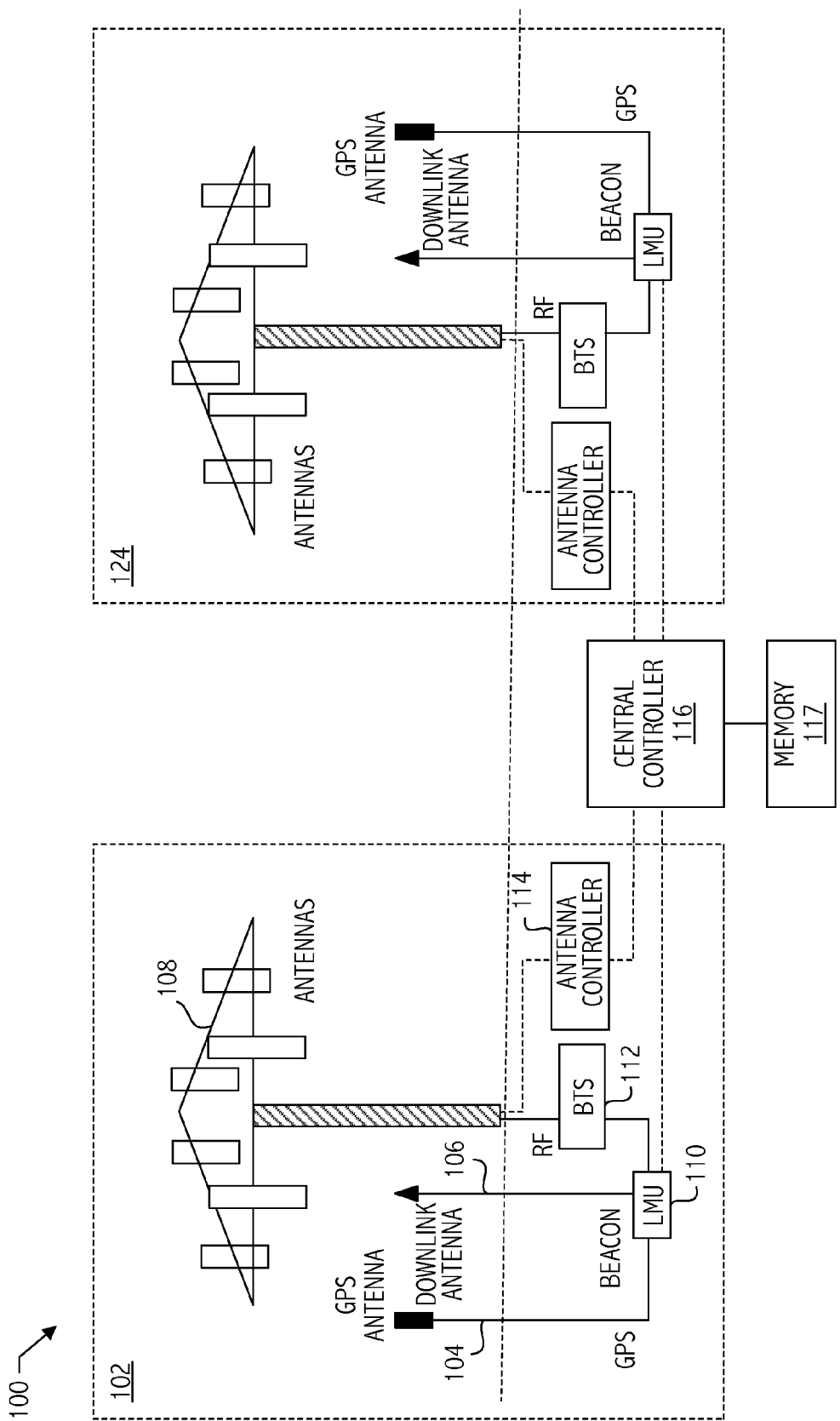
FIG. 1 illustrates an exemplary portion of a mobile communications system consistent with at least one embodiment of the invention.

Referring to FIG. 1, an exemplary mobile communications system (e.g., mobile communications system 100) includes an exemplary base station subsystem (e.g., BSS 102) located in a first geographical region. In at least one embodiment of BSS 102, antenna 108, e.g., a Remote Electrical Tilting antenna, is located at the top of a cell tower and typically includes an array of antenna elements. Typically, operating parameters of antenna 108 are set during initial system deployment and may be adjusted after deployment in response to traffic distribution changes, to reduce interference, or other factors. For example, adjustments to an angle in a downward direction to which the antenna is directed (i.e., downtilt) for the exemplary antenna system may be made remotely to reduce interference. Remotely controlled adjustments to the antenna reduce system cost by decreasing the frequency of cell technician dispatches to a site of the antenna system. Although adjustments to the configuration of antenna 108 may be controlled remotely, techniques for verifying antenna performance after updating an operating parameter may include controller confirmation of the change, monitoring performance impact via operation and support system key performance indicators (i.e., OSS KPI), and/or field drive test measurements, which require substantial time and expense to implement.

Mobile communications system 100 implements Enhanced 911 (i.e., E-911) service, which is a caller location service that associates a physical address with a telephone number of a calling party. Mobile communications system 100 routes an associated emergency call to an appropriate Public Safety Answering Point for that address. The E-911 service of mobile communications system 100 may locate the geographical location of a mobile communications device using radiolocation via the cellular network or by using a Global Positioning System (i.e., GPS) that is included in the mobile communications device.

In at least one embodiment, mobile communications system 100 implements E-911 service using a Location Measurement Unit (LMU) to receive radio frequency (i.e., RF) signals from main RF feeders, a GPS antenna to receive GPS timing information, and a downlink antenna to receive pilot or beacon signal information from neighboring cell sites for location measurements assistance, as well as call handling. In general, pilot or beacon signals are received from neighboring cell sites to provide timing synchronization between a serving cell site and its neighboring cell sites. In at least one embodiment, the LMU measures an arrival time of a radio frequency signal transmitted by a mobile communications device calling for help using known coordinates of the neighboring cell sites. By calculating a difference in arrival times at multiple pairs of downlink antennas at neighboring cell sites and using triangulation or other suitable techniques, the LMU may determine a location of the mobile communications device. Unlike traditional base station antennas (e.g., Remote Electrical Tilting (RET) antennas) mounted at the top of a cell tower, typically, a downlink antenna is installed at the bottom of the cell tower and is only several feet tall. The downlink antenna receiving characteristics are similar to those of a traditional drive test vehicle that includes antennas mounted on the roof of the drive test vehicle.

In at least one embodiment, BSS 102 includes a global positioning system antenna (e.g., GPS antenna 104), an antenna (e.g., antenna 108, which may be an RET antenna) mounted atop a cell tower, and a downlink antenna (e.g., downlink antenna 106). GPS antenna 104 is used to receive GPS timing information. Downlink antenna 106 is a local, dedicated antenna located at the base of the cell tower, as described above.

Base station subsystem 102 also includes one or more processing units. For example, BSS 102 includes a location measurement unit (e.g., LMU 110), a base transceiver station (e.g., BTS 112), and an antenna controller (e.g., antenna controller 114). In at least one embodiment of the invention, LMU 110 includes a receiver, which may be implemented by hardware, software, or a combination thereof, configured to demodulate radio frequency signals received on downlink antenna 106 from one or more transmitting devices. In at least one embodiment, LMU 110 includes a digital signal processing circuit configured to digitize, digitally process, and store information associated with the received signals. In at least one embodiment, LMU 110 is configured to perform a location estimate based on those received signals, e.g., by performing high-speed cross-correlation of detected signals. Base transceiver station 112 facilitates wireless communications between user equipment and a network, and may be any suitable BTS. Antenna controller 114 is configured to set and adjust operating parameters of antenna 108. In at least one embodiment, antenna 108 includes one or more RET antennas having operating parameters including antenna radiation pattern and/or downtilt, which may be varied by antenna controller 114 according to a target coverage area, a target capacity, or interference reduction. In at least one embodiment, antenna controller 114 adjusts one or more of other antenna operating parameters including half-power beamwidth, vertical beamwidth tilting, horizontal beamwidth azimuth change, or other suitable operating parameters of antenna 108.

Although processing units 110, 112, and 114 are illustrated separately in FIG. 1, in at least one embodiment of mobile communications system 100, the functions of one or more of those processing units are performed by a single processing unit in hardware or by computer executables executing on a general purpose processor unit in BSS 102. The base station subsystem 102 communicates with central controller 116 of a wireless network, which is coupled to one or more additional base station subsystems (e.g., BSS 124) located in one or more other geographical regions, e.g., neighboring cell sites. Central controller 116 is coupled to antenna controllers of individual base station subsystems (e.g., antenna controller 114 of BSS 102) via the Internet, one or more private networks, or any other suitable communications techniques.

Figure 2:
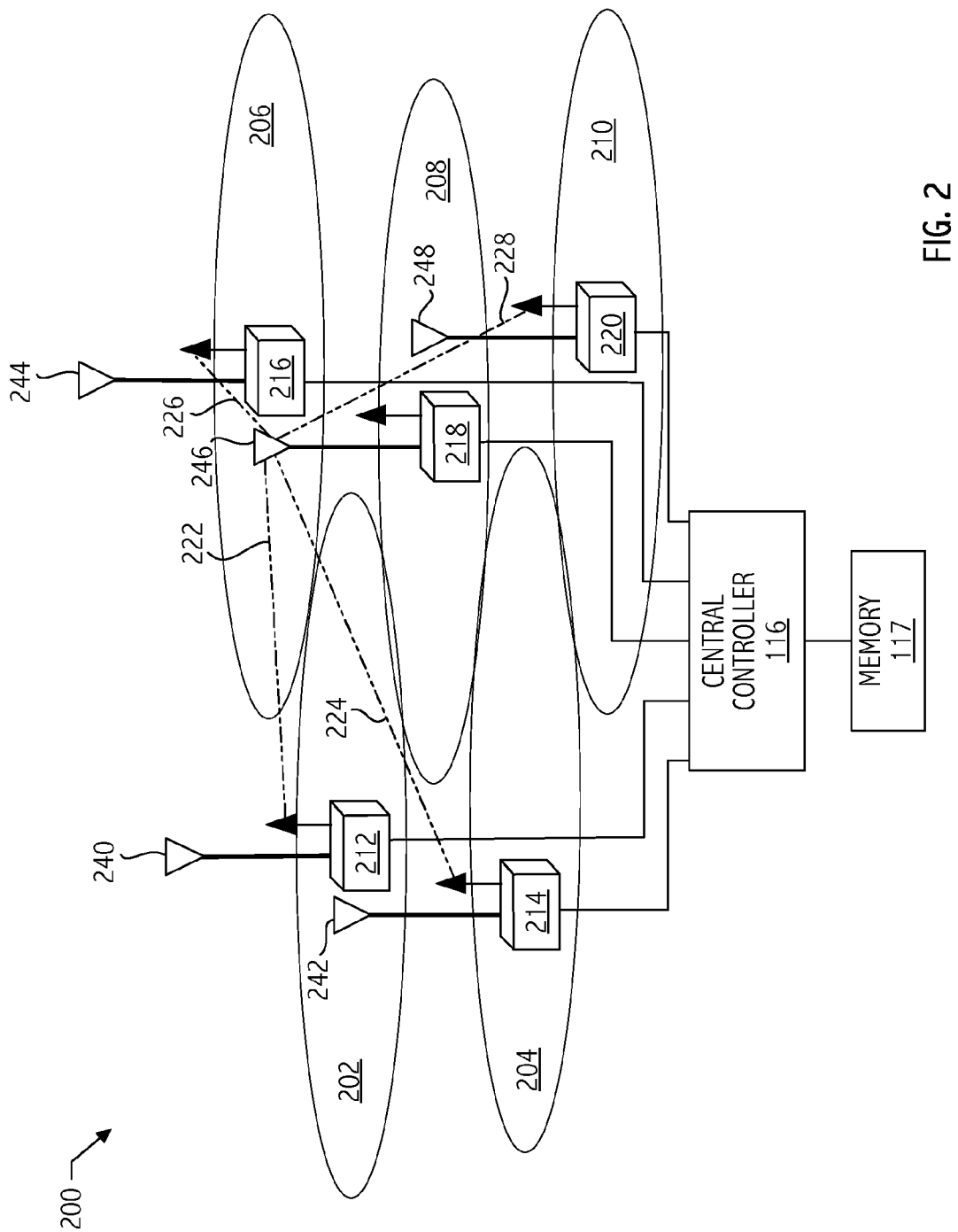
FIG. 2 illustrates an exemplary configuration of a mobile communications system consistent with at least one embodiment of the invention.

Referring to FIG. 2, an exemplary mobile communications system (e.g., mobile communications system 200) includes multiple base station subsystems (e.g., BSS 212, 214, 216, 218, and 220) located in corresponding geographical regions (e.g., regions 202, 204, 206, 208, and 210). A first base station subsystem, e.g., BSS 218 in region 208, transmits one or more beacon signals using one or more antennas 246. That beacon signal is received as signals 222, 224, 226, and 228, by corresponding downlink antennas of BSS 212, 214, 216, and 220 in respective regions 202, 204, 206, and 210. Corresponding processing units of BSS 212, 214, 216, and 220 collect radio frequency data received by those corresponding downlink antennas.

In at least one embodiment of mobile communications system 200, BSS 212, 214, 216, and 220 process the radio frequency data received from BSS 218 and identify a received signal corresponding to the beacon signal sent by BSS 218. For example, processing units of BSS 212, 214, 216, and 220 may determine information corresponding to the signal received from BSS 218, e.g., signal timing, signal strength, energy bit to noise ratio (i.e., $E_b/N_0$), signal-to-interference ratio (i.e., SIR), bit-error rate (i.e., BER), frame error rate (i.e., FER), block error rate (i.e., BLER), and/or other quality of service information. Respective antenna controllers of BSS 212, 214, 216, and 220 transmit the processed data, raw data, or a combination thereof to a central antenna controller of the wireless network, e.g., central controller 116.

Central controller 116 receives the information based on radio frequency signals received by downlink antennas in cell sites 202, 204, 206, and 210. Central controller 116 evaluates these data and determines whether one or more antennas 246 associated with BSS 218 in region 208 are properly configured. In at least one embodiment, central controller 116 provides feedback to BSS 218 for use in adjusting one or more antennas 246. If central controller 116 determines that the one or more antennas 246 are not properly configured, central controller 116 can remotely adjust operating parameters for the one or more antennas 246 of BSS 218 based on the information obtained.

In at least one embodiment of mobile communications system 200, antennas 240, 242, 244, 246, and 248 are RET antennas and the operating parameters include one or more of an antenna radiation pattern, antenna downtilt, half-power beamwidth, vertical beamwidth tilting, horizontal beamwidth azimuth change, and/or other suitable operating parameters. In at least one embodiment, central controller 116 adjusts the transmit power or frequency of neighboring cell sites. Central controller 116 then communicates the updated operating parameters to BSS 218. BSS 218 reconfigures the one or more antennas 246 consistent with those updated operating parameters. Central controller 116 collects similar data corresponding to RF signals received from the antennas of BSS 212, 214, 216, and 220 from downlink antennas of corresponding neighboring cell sites. The collected data is then processed to assist calibration and reconfiguration of antennas 240, 242, 244, and 248.

Figure 3:
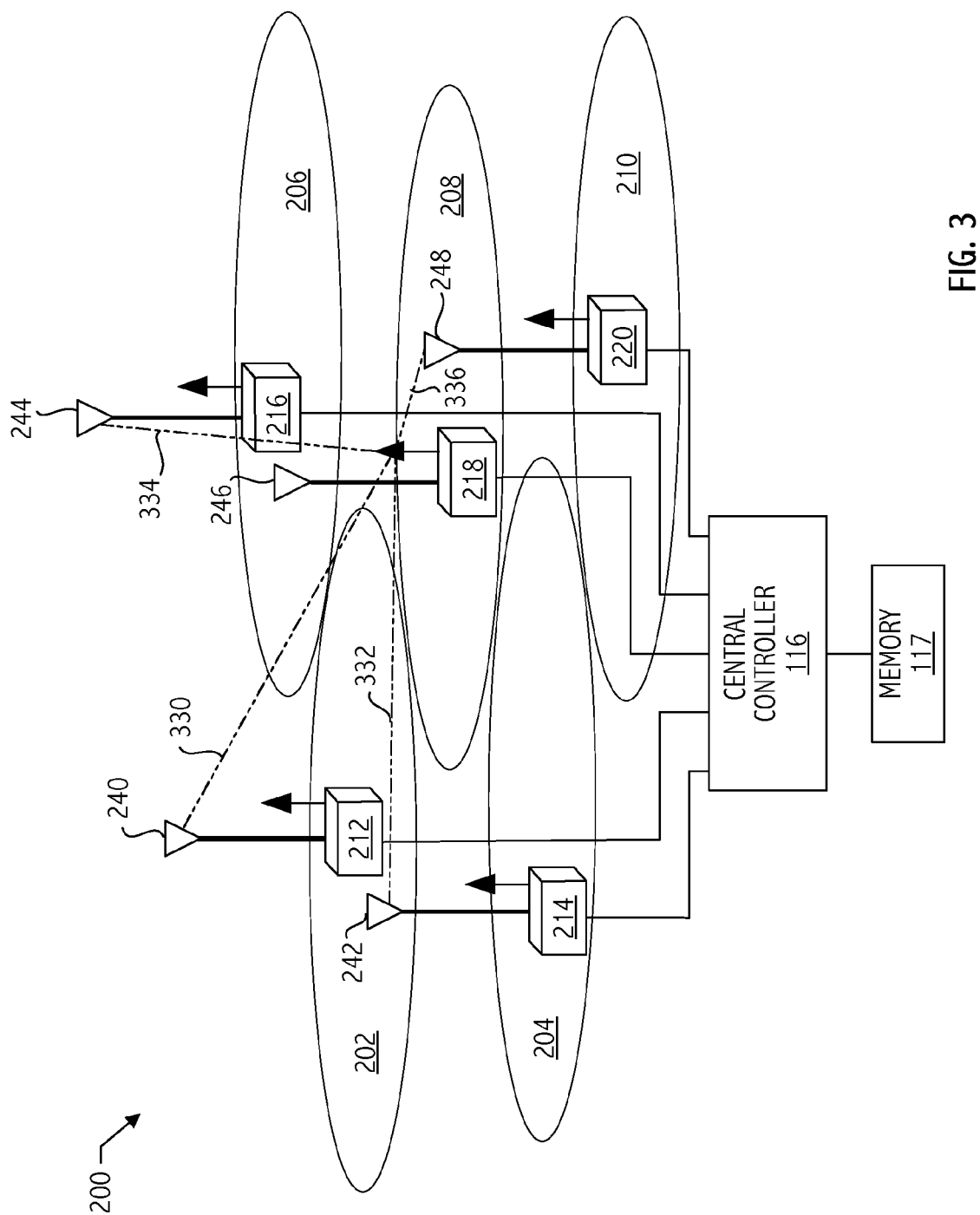
FIG. 3 illustrates an exemplary configuration of a mobile communications system consistent with at least one embodiment of the invention.

Referring to FIG. 3, in at least one embodiment of mobile communications system 200, an individual downlink antenna receives a pilot or beacon signal from each of the BSS in neighboring cell sites. For example, the downlink antenna of BSS 218 receives radio frequency signals 330, 332, 334, and 336 from antennas associated with BSS 212, 214, 216, and 220, respectively. A processing unit in BSS 218 demodulates those signals received from antennas in the neighboring cell sites and communicates associated data to central controller 116. In at least one embodiment, central controller 116 uses those data, along with data collected from other downlink antennas in neighboring cell sites to determine updated operating parameters for the one or more antennas in neighboring cell sites.

Referring to FIGS. 2 and 3, in at least one embodiment, central controller 116 may remotely log in to an individual BSS and issue a command to the individual BSS to retrieve data and/or issue a command to update operating parameters of the antenna of the individual BSS (e.g., increase or decrease downtilt). In at least one embodiment of a mobile communications system, when one or more of antennas 240, 242, 244, 246, and 248 are adjusted, all neighboring downlink antenna information will be collected and analyzed by central controller 116 to quickly determine the impact of the adjustment. For example, if the strength of a signal received by one or more neighboring BSS is too strong or too weak (e.g., based on a comparison of signal strength as compared to one or more signal strength threshold values), the signal strength may indicate that a current antenna operating parameter (e.g., downtilt) is not effective. In at least one embodiment of a mobile communications system, the number of sites involved in this analysis can be limited to particular sites specified by central controller 116 (e.g., stored in memory 117).

In at least one embodiment, central controller 116 periodically collects RF data received on downlink antennas of cell sites neighboring a particular antenna, periodically analyzes those data, and periodically sends updated operating parameters to the BSS associated with the particular antenna. In at least one embodiment, central controller 116 is configured to collect RF data received on downlink antennas of cell sites neighboring to a particular antenna, analyze those data, and send updated operating parameters to the BSS associated with the particular antenna, as needed or on-demand (e.g., triggered by a user of the central controller 116).

In at least one embodiment of a mobile communications system, if a downlink antenna of a first cell site receives extremely strong RF signals from a faraway, neighboring cell site, central controller 116 may indicate that the faraway, neighboring cell site is not configured properly and may adjust operating parameters of the faraway, neighboring cell site. Similarly, if a downlink antenna of a first cell site receives extremely weak RF signals from a nearby, neighboring cell site, central controller 116 may be configured to adjust operating parameters of the nearby, neighboring cell site or may be configured to indicate to a user that the nearby, neighboring cell site is not configured properly. A signal may be considered extremely strong or extremely weak based on a comparison of signal strength (e.g., pilot or beacon signal received signal strength indication (i.e., RSSI)) to one or more threshold values. Those threshold values may be predetermined and stored in a memory associated with central controller 116 or programmable by a user of central controller 116. In at least one embodiment, central controller 116 compares signal RSSI information to predetermined neighboring cell site information stored in memory 117.

In at least one embodiment, central controller 116 is configured to receive data (e.g., packets) via a downlink antenna from a particular antenna and compare those received data to expected data (e.g., stored in memory 117) and determine a bit-error rate associated with the particular antenna. If the bit-error rate is greater than a particular threshold value, central controller 116 may indicate to a user that the particular cell site is not configured properly and may adjust operating parameters of the particular cell site. The threshold value may be predetermined and stored in a memory associated with central controller 116 or programmable by a user of central controller 116.

In at least one embodiment, central controller 116 is configured to collect RF data received by downlink antennas, but associated with other portions of the RF spectrum than those signals sent by antennas 240, 242, 244, 246, and 248 in cell sites neighboring the downlink antenna's cell site. Those data may be analyzed to assist other tasks besides antenna calibration, e.g., those data may be used for interference troubleshooting. For example, an unexpectedly strong signal that is detected from a neighboring cell site and that is not reduced by adjustments of the antenna may indicate foreign interferers existing in the area. Accordingly, a user of the system may initiate increasingly thorough interference troubleshooting e.g., using a spectrum analyzer and a directional antenna. In at least one embodiment, central controller 116 is configured to adjust the number of cell sites from which RF information is received.

Since downlink antennas, which have antenna height similar to drive test van antenna height, are already implemented in the field for E-911 compliance, each downlink antenna implemented in the field may provide an access test point requiring little or no additional hardware consistent with the disclosed antenna calibration and update techniques. Accordingly, the disclosed antenna calibration and update techniques may reduce or eliminate the need for expensive drive testing and provide quick performance verification for antenna configuration utilizing fixed measurements.

Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium and a network, wireline, wireless or other communications medium.

The description of the invention set forth herein is illustrative, and is not intended to limit the scope of the invention as set forth in the following claims. For example, while the invention has been described in an embodiment in which Remote Electrical Tilting antennas are used, one of skill in the art will appreciate that the teachings herein can be utilized with other antenna systems having remotely accessible controllers. Variations and modifications of the embodiments disclosed herein, may be made based on the description set forth herein, without departing from the scope and spirit of the invention as set forth in the following claims.

What is claimed is:

1. An apparatus comprising:
 a storage device configured to store predetermined information; and
 a central antenna control facility configured to communicate at least one operation parameter to a first antenna facility associated with a first antenna included in a first base station subsystem (BSS) in a first cell coverage area, the at least one operation parameter being at least partially based on the predetermined information and information associated with a signal received from the first antenna by a downlink antenna of an Enhanced 911 service of a second BSS in a second cell coverage area, the central antenna control facility being further configured to receive the information associated with the signal from a second antenna facility associated with the second cell coverage area, the second antenna facility being configured to receive the signal from the downlink antenna and generate the information at least partially based on the signal received by the downlink antenna,
 wherein the first antenna is a Remote Electrical Tilting (RET) antenna and the first antenna facility adjusts at least one of downtilt and a radiation pattern associated with the RET antenna based on the at least one operation parameter.

2. The apparatus, as recited in claim 1, further comprising:
 the downlink antenna; and
 the second antenna facility, wherein the second antenna facility is further configured to communicate the information to the central antenna control facility.

3. The apparatus, as recited in claim 2, wherein the second antenna facility is a Location Management Unit configured to measure beacon timing from signals received by the downlink antenna.

4. The apparatus, as recited in claim 1, further comprising:
the first antenna; and
a first antenna facility configured to adjust the first antenna consistent with the at least one operation parameter of the first antenna received from the central antenna control facility.

5. The apparatus, as recited in claim 1, wherein the information includes at least one of timing information, signal strength information, error rate information, bit-to-noise ratio information, and signal-to-interference ratio information.

6. The apparatus, as recited in claim 1, wherein the information is compared to a predetermined threshold value to determine whether to adjust operation parameters associated with the first antenna in the first cell coverage area.

7. An apparatus comprising:
a storage device configured to store predetermined information; and
a central antenna control facility configured to communicate at least one operation parameter to a first antenna facility associated with a first antenna included in a first base station subsystem (BSS) in a first cell coverage area, the at least one operation parameter being at least partially based on the predetermined information and information associated with a signal received from the first antenna by a downlink antenna of an Enhanced 911 service of a second BSS in a second cell coverage area, the central antenna control facility being configured to collect information from a plurality of downlink antennas of corresponding caller location services in corresponding coverage areas of a plurality of distinct cell coverage areas and configured to provide antenna operation parameters to a plurality of corresponding antenna facilities in corresponding ones of the plurality of distinct cell coverage areas, the antenna operation parameters being determined at least partially based on the collected information,
wherein the first antenna is a Remote Electrical Tilting (RET) antenna and the first antenna facility adjusts at least one of downtilt and a radiation pattern associated with the RET antenna based on the at least one operation parameter.

8. The apparatus, as recited in claim 1, wherein the information is periodically sent from the second cell coverage area to the central controller.

9. The apparatus, as recited in claim 1, wherein the information is sent on-demand from the second cell coverage area to the central controller.

10. A method comprising:
receiving at least one operation parameter, from a central antenna control facility, by a first antenna facility associated with an antenna included in a first base station subsystem (BSS) in a first cell coverage area, the at least one operation parameter being at least partially based on predetermined information and information associated with a signal received from the antenna by a downlink antenna of an Enhanced 911 service of a second BSS in a second cell coverage area, the information associated with the signal having been received by the central antenna control facility from a second antenna facility associated with the second cell coverage area, and the information having been generated by the second antenna facility at least partially based on the signal received by the downlink antenna,
updating at least one operation parameter of the antenna at least partially based on the information,
wherein the antenna is a Remote Electrical Tilting (RET) antenna and the updating adjusts at least one of downtilt and a radiation pattern associated with the RET antenna based on the at least one operation parameter.

11. The method, as recited in claim 10, wherein the information is data received in the signal, the method further comprising:
determining a measurement based on a comparison of the data to expected data stored in the memory; and
determining the at least one operation parameter based thereon.

12. The method, as recited in claim 10, further comprising:
communicating the information from the second cell site to the central antenna control facility.

13. The method, as recited in claim 10, further comprising:
receiving the signal from the first cell site by a plurality of downlink antennas of corresponding Enhanced 911 services of a plurality of cell sites, the information being based on a plurality of received signals corresponding to individual downlink antennas of the plurality of downlink antennas.

14. An apparatus comprising:
a downlink antenna of an Enhanced 911 service of a first base station subsystem (BSS) in a first cell coverage area;
an antenna in a second BSS in a second cell coverage area; and
means for centrally controlling the antenna by communicating at least one operation parameter to a first antenna facility associated with the antenna, the at least one operation parameter being at least partially based on predetermined information and information associated with a signal received from the antenna by the downlink antenna, the means for centrally controlling receiving the information associated with the signal from a second antenna facility associated with the first cell coverage area, the second antenna facility having generated the information at least partially based on the signal received by the downlink antenna,
wherein the antenna is a Remote Electrical Tilting (RET) antenna, and the means for centrally controlling adjusts at least one of downtilt and a radiation pattern associated with the RET antenna based on the signal.

15. The apparatus, as recited in claim 1, wherein the first antenna is mounted at a top of a first cell tower and the downlink antenna is installed at a bottom of a second cell tower and is approximately several feet tall.

16. The apparatus, as recited in claim 1, wherein the downlink antenna is a local, dedicated antenna configured to receive a beacon signal from at least one neighboring cell site.

17. The method, as recited in claim 10, wherein the antenna is mounted at a top of a first cell tower and the downlink antenna is installed at a bottom of a second cell tower and is approximately several feet tall.

18. The apparatus, as recited in claim 14, wherein the downlink antenna is installed at a bottom of a cell tower and is approximately several feet tall.

19. The method, as recited in claim 11, wherein the measurement is a bit-error rate and determining the at least one operation parameter comprises:

comparing the bit-error rate to a predetermined threshold value and determining the at least one operation parameter at least partially based thereon.

20. The method, as recited in claim 10, further comprising:
analyzing radio frequency data received by the downlink antenna associated with radio frequency signals outside the spectrum of the signal received from the first antenna.

21. The apparatus, as recited in claim 7, wherein the information is periodically sent from the second cell coverage area to the central controller.

22. The apparatus, as recited in claim 7, wherein the information is sent on-demand from the second cell coverage area to the central controller.

* * * * *